(12) United States Patent
Lampert et al.

(10) Patent No.: US 7,396,377 B2
(45) Date of Patent: Jul. 8, 2008

(54) COMPACT FILTER COMPRISING A SQUARE SEAL

(75) Inventors: Johannes Lampert, Remseck (DE); Andreas Pelz, Markgroeningen (DE)

(73) Assignee: Mann & Hummel GmbH, Ludwigsburg (DE)

( * ) Notice: Subject to any disclaimer, the term of this patent is extended or adjusted under 35 U.S.C. 154(b) by 0 days.

(21) Appl. No.: 11/783,200

(22) Filed: Apr. 6, 2007

(65) Prior Publication Data

US 2007/0261662 A1 Nov. 15, 2007

Related U.S. Application Data

(63) Continuation of application No. PCT/EP2005/054171, filed on Aug. 24, 2005.

(30) Foreign Application Priority Data

Oct. 8, 2004 (DE) ........................ 10 2004 049 403

(51) Int. Cl.
*B01D 46/00* (2006.01)

(52) U.S. Cl. ................. 55/502; 55/385.3; 55/498; 55/503; 55/520; 55/521; 123/198 E

(58) Field of Classification Search ............. 55/385.3, 55/498, 502, 503, 520, 521; 123/198 E
See application file for complete search history.

(56) References Cited

U.S. PATENT DOCUMENTS

| 4,925,469 | A  | * | 5/1990  | Clement et al. ............... 55/480 |
| 5,472,463 | A  | * | 12/1995 | Herman et al. ................ 55/319 |
| 5,902,364 | A  | * | 5/1999  | Tokar et al. ................... 55/498 |
| 6,179,890 | B1 | * | 1/2001  | Ramos et al. ................. 55/482 |
| 6,190,432 | B1 | * | 2/2001  | Gieseke et al. ............. 55/385.3 |
| 6,350,291 | B1 |   | 2/2002  | Gieseke et al. |
| 6,517,598 | B2 | * | 2/2003  | Anderson et al. ............ 55/498 |
| 6,852,141 | B2 | * | 2/2005  | Bishop et al. ............. 55/385.3 |
| 6,878,190 | B1 | * | 4/2005  | Xu et al. ..................... 95/273 |
| 6,966,940 | B2 | * | 11/2005 | Krisko et al. ................ 55/497 |

FOREIGN PATENT DOCUMENTS

EP 1 216 737 A2 6/2002

* cited by examiner

*Primary Examiner*—Duane Smith
*Assistant Examiner*—Robert A Clemente
(74) *Attorney, Agent, or Firm*—Crowell & Moring LLP

(57) ABSTRACT

A filter element comprising a spirally wound filter through which a fluid to be filtered flows axially and which is provided with a mounting ring on the circumference of the wound filter secured to the wound filter by a welded, adhesive, extruded or fused joint. The mounting ring is provided with a circumferential profiled seal which engages a housing in which the filter element is installed to provide a seal between an unfiltered fluid side of the filter element and a filtered fluid side of the filter element.

12 Claims, 2 Drawing Sheets

COMPACT FILTER COMPRISING A SQUARE SEAL

CROSS REFERENCE TO RELATED APPLICATIONS

This application is a continuation of international patent application no. PCT/EP2005/054171, filed Aug. 24, 2005 designating the United States of America and published in German on Apr. 20, 2006 as WO 2006/040214, the entire disclosure of which is incorporated herein by reference. Priority is claimed based on Federal Republic of Germany patent application no. 10 2004 049,403.7, filed Oct. 8, 2004.

BACKGROUND OF THE INVENTION

This invention relates to a filter element comprising a spirally wound filter through which a fluid to be filtered flows axially.

U.S. Pat. No. 6,322,602 B2 describes an air filter in a cylindrical air filter housing with a filter element designed for axial flow. At one axial end face in the area of the inflow side of the filter, the holding space for receiving the filter in the filter housing can be closed by a housing cover. To replace the filter element, the cover is detached, and the filter element can then be axially removed from the holding space and replaced by a new filter element.

This embodiment has the disadvantage that the housing cover must be removed in the inflow area to replace the filter element, which requires the entire filter housing to be first removed from its installation position because the housing cover is connected to the inflow lines for the air to be filtered. Replacing the filter element therefore requires a considerable amount of effort. This increases the servicing time and causes substantial servicing costs.

SUMMARY OF THE INVENTION

An object of the invention is to provide an improved spirally wound, axial flow filter element.

Another object of the invention is to provide a structurally simple filter with a filter element that can be serviced economically.

A further object of the invention is to provide a filter element which improves the use of space within a filter housing in which the filter element is installed.

Yet another object of the invention is to provide an improved filter system which incorporates a filter element according to the invention.

These and other objects are achieved in accordance with the present invention by providing a filter element comprising a wound filter with axial flow channels, said filter element having a mounting ring around its circumference secured to the wound filter by a welded, bonded, extruded or fused connection, wherein the mounting ring carries a circumferential profiled seal which, when the filter element is installed in a housing, engages the housing to provide a seal between an unfiltered fluid side of the filter element and a filtered fluid side of the filter element.

In a further aspect of the invention, the objects are also achieved by providing a filter system for a filter element in accordance with the present invention, comprising a housing with at least two housing parts assembled to each other, wherein the housing can be separated in the area where the filter element is mounted, and wherein the profiled seal is clamped between the assembled housing parts.

In accordance with the invention the filter element is connected to a mounting ring. This mounting ring may be secured to the filter medium constructed as a wound filter by a welded, bonded, extruded or fused connection. A circumferential profiled seal is disposed on the mounting ring to ensure sealing action in conjunction with the housing between the unfiltered air side and the filtered air side. Using a mounting ring, which can be adapted to the structure of the filter element with relative ease, makes it possible to standardize the housing structure. For example, smaller, longer or shorter filter elements can be installed in a housing with a given diameter. Furthermore, the structure of the mounting ring enables a very simple design of the profiled seal.

One advantageous embodiment provides for a rectangular seal design that is supported against a circumferential collar of the mounting ring. It is of course also possible to bond the profiled seal to the mounting ring.

In another embodiment it is proposed to produce the mounting ring in a two-component injection molding process and to form the profiled seal on the ring as the second component. The profiled seal may advantageously seal axially or radially. It is also possible to achieve both a radial and an axial seal simultaneously.

The housing for the filter system advantageously comprises two housing parts which can be separated in the mounting area of the filter element. The profiled seal can be clamped between the two housing parts and ensures that no unfiltered air is drawn in through the contact area between the housing parts.

The housing parts are advantageously interconnected by latching or clamping closures. They can, of course, also be screwed together.

In yet another advantageous embodiment, the housing parts have one or more contact surfaces in the area where the filter element is fastened. This means that the two housing parts lie against one another in the axial direction as they are clamped together, while at the same time the seal is located between the two housing parts and the sealing action is achieved with a defined compression.

These and other features of preferred embodiments of the invention, in addition to being set forth in the claims, are also disclosed in the specification and/or the drawings, and the individual features each may be implemented in embodiments of the invention either alone or in the form of subcombinations of two or more features and can be applied to other fields of use and may constitute advantageous, separately protectable constructions for which protection is also claimed.

BRIEF DESCRIPTION OF THE DRAWINGS

The invention will be described in greater detail hereinafter with reference to illustrative preferred embodiments shown in the accompanying drawing figures, in which.

DETAILED DESCRIPTION OF PREFERRED EMBODIMENTS

Figure 1:
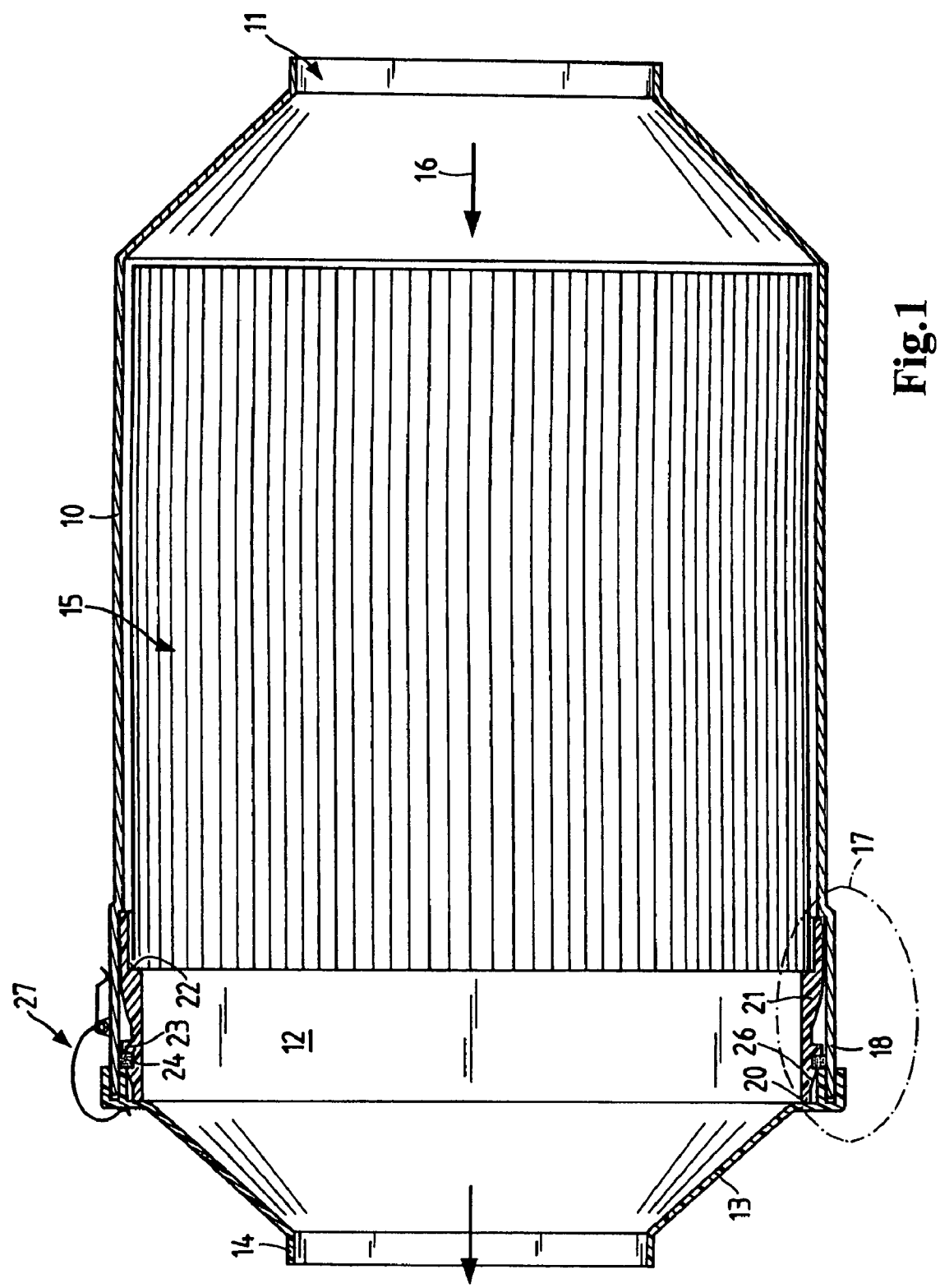
FIG. 1 is a sectional view of a filter system incorporating a filter element according to the present invention.

The filter system according to FIG. 1 comprises a housing 10 with a substantially concentric, oval or elliptical design. This housing 10 has an unfiltered air inlet 11 coupled to an unfiltered air intake fitting, which is not depicted here. A housing cover 13 is provided on the filtered air side 12. This cover also has a connection fitting 14, to which a filtered air line can be connected. A filter element 15 is located within the housing 10. This element corresponds to that described in WO 2004-020075, for example. The air flows through the filter element in the direction of arrow 16, and the filtered air leaves the filter element axially on the filtered air side 12.

The connecting area 17, which extends over the entire circumference of the filter system, comprises both the fastening of the filter element 15 and the connection between the housing 10 and the housing cover 13.

Figure 2:
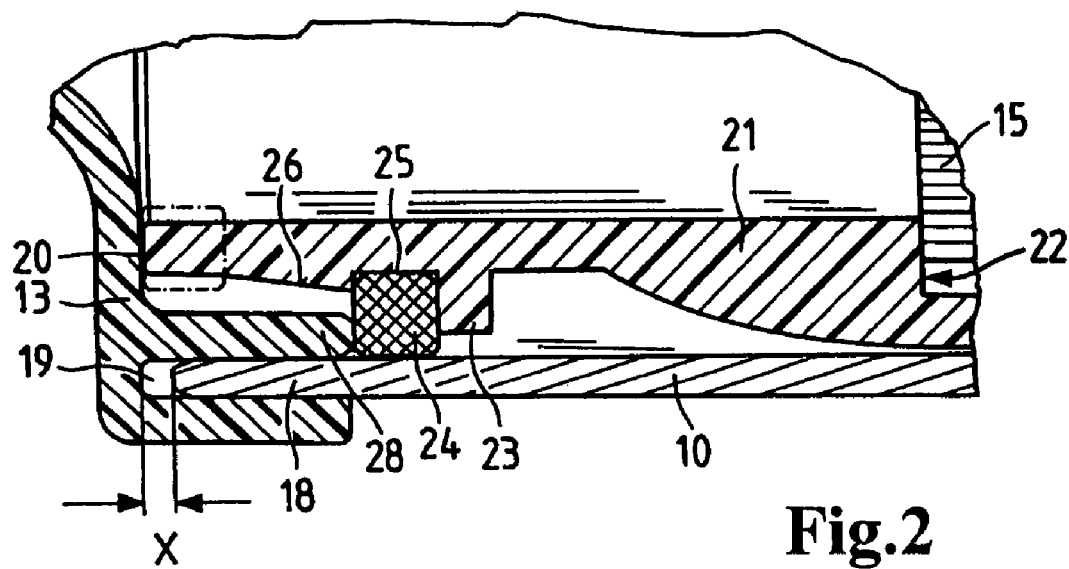
FIG. 2 is a sectional detail view of the filter system depicted in FIG. 1.

This connection area is illustrated in greater detail in FIG. 2. Like components are identified by the same reference numerals. The housing 10 with its circumferential rim 18 engages a circumferential groove 19 of the housing cover 13. The rim 18 does not extend all the way to the bottom of the groove but leaves a certain tolerance distance X. The housing cover 13 has a contact surface 20, which also extends circumferentially and which serves to support a mounting ring 21.

The mounting ring 21 serves to receive the filter element 15. On its side facing the filter element, it has a shoulder 22 into which the filter element is bonded or welded. This shoulder affects the filtering area of the filter element only slightly. The mounting ring 21 is furthermore provided with a circumferential bead 23. A profiled seal 24 is supported against this bead. This seal is substantially rectangular and is fixed in a groove 25 of the mounting ring 21. To make it easier to mount the profiled seal 24 to the mounting ring 21, an inclined insertion surface 26 is provided, over which the profiled seal 24 can be slipped.

On its end face opposite the filter element 15, the mounting ring 21 is supported against the contact surface 20, as mentioned above. This contacting between the mounting ring 21 and the housing cover 13 prevents the profiled seal 24 from being deformed if the housing cover 13 and the housing 10 are connected with excessive pressing force. The two parts are connected by means of clamping closures 27 disposed along the circumference of the housing 10 (see FIG. 1).

It is also possible to arrange a seal in the area of the contact surface 20 on the mounting ring 21. In this case, contacting occurs between the housing cover 13 and the mounting ring 21 in the area of the bead 23 in conjunction with the groove side 28. The profiled seal 24 seals both axially and radially. The seal can of course also be designed to seal only axially.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. A filter element comprising a wound filter with axial flow channels, said filter element having a mounting ring around its circumference secured to the wound filter by a welded, bonded, extruded or fused connection, wherein the mounting ring carries a circumferential profiled seal which, when the filter element is installed in a housing, engages the housing to provide a seal between an unfiltered fluid side of the filter element and a filtered fluid side of the filter element, wherein the mounting ring has, on a side facing the filter element, a projection or shoulder into which the filter element is adhesively bonded or welded, and the mounting ring has a circumferential bulge or bead, and wherein the profiled seal is supported against the bulge or bead, and the profiled seal is fixed in a groove of the mounting ring.

2. A filter element as claimed in claim 1, wherein said filter element is mounted in an air intake tract of an internal combustion engine.

3. A filter element as claimed in claim 1, wherein the filter element is an air filter element.

4. A filter element as claimed in claim 1, wherein in that the profiled seal has a substantially rectangular cross-sectional configuration and is supported against a circumferential collar of the mounting ring.

5. A filter element as claimed in claim 1, wherein the profiled seal is produced together with the mounting ring in a two-component injection molding process.

6. A filter element as claimed in claim 1, wherein the seal has an axial sealing action.

7. A filter element as claimed in claim 1, wherein the seal has a radial sealing action.

8. A filter element as claimed in claim 1, wherein the seal has both an axial sealing action and a radial sealing action.

9. A filter system for a filter element as claimed in claim 1, comprising a housing with at least two housing parts assembled to each other, wherein the housing can be separated in the area where the filter element is mounted, and wherein the profiled seal is clamped between the assembled housing parts.

10. A filter system as claimed in claim 9, wherein the housing parts are connected by latching or clamping closures.

11. A filter system as claimed in claim 9, wherein the housing is provided with a connection fitting on the filtered fluid side for attaching a filtered fluid duct, and wherein the junction between the filter element and the connection fitting is substantially conical.

12. A filter system as claimed in claim 9, wherein in the area where the filter element is mounted, the housing parts contact each other with a flange or web surface.

* * * * *